US009397866B2

(12) United States Patent
Karakayali et al.

(10) Patent No.: US 9,397,866 B2
(45) Date of Patent: Jul. 19, 2016

(54) DISTRIBUTED MULTI-CELL SUCCESSIVE INTERFERENCE CANCELLATION FOR UPLINK CELLULAR NETWORKS

(75) Inventors: Kemal M. Karakayali, Highland Park, NJ (US); Krishna Balachandran, Morganville, NJ (US); Srinivas R. Kadaba, Chatham, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 2198 days.

(21) Appl. No.: 12/232,303

(22) Filed: Sep. 15, 2008

(65) Prior Publication Data

US 2010/0069010 A1    Mar. 18, 2010

(51) Int. Cl.
| | | |
|---|---|---|
| H04B 1/00 | (2006.01) |
| H04L 25/03 | (2006.01) |
| H04B 7/02 | (2006.01) |
| H04J 11/00 | (2006.01) |
| H04L 5/00 | (2006.01) |

(52) U.S. Cl.
CPC .......... *H04L 25/03012* (2013.01); *H04B 7/024* (2013.01); *H04J 11/004* (2013.01); *H04J 11/0053* (2013.01); *H04L 5/0035* (2013.01); *H04L 5/0073* (2013.01); *H04L 5/0058* (2013.01); *H04L 2025/03802* (2013.01)

(58) Field of Classification Search
CPC ....................................................... H04J 11/004
USPC ......................................................... 455/63.1
See application file for complete search history.

(56) References Cited

U.S. PATENT DOCUMENTS

| | | | |
|---|---|---|---|
| 2005/0180364 A1* | 8/2005 | Nagarajan et al. ............ 370/335 |
| 2007/0040704 A1 | 2/2007 | Smee et al. |
| 2007/0248052 A1 | 10/2007 | Nagaraj et al. |
| 2008/0130777 A1* | 6/2008 | Landau et al. ................ 375/267 |

FOREIGN PATENT DOCUMENTS

| | | |
|---|---|---|
| CN | 1266317 A | 9/2000 |
| CN | 1453941 A | 11/2003 |
| CN | 1949685 A | 4/2007 |
| CN | 101288241 A | 10/2008 |

(Continued)

OTHER PUBLICATIONS

Notification of Transmittal of the International Search Report and the Written Opinion of the International Searching Authority, or the Declaration, dated Nov. 5, 2010, issued in International Application No. PCT/US2009/005122.
International Search Report dated Nov. 5, 2010, issued in International Application No. PCT/US2009/005122.
Written Opinion of the International Search Authority dated Nov. 5, 2010, issued in International Application No. PCT/US2009/005122.

(Continued)

*Primary Examiner* — Hsin-Chun Liao
(74) *Attorney, Agent, or Firm* — Harness, Dickey & Pierce, P.L.C.

(57) ABSTRACT

Example embodiments are directed to methods of reducing inter-cell interference in wireless networks using successive interference cancellation (SIC). Example embodiments use inter-cell cooperation between cells and/or sectors to successfully decode their associated users' data signals and pass on the decoded data signals to other cells/sectors in order to reduce inter-cell interference and allow for improved decoding of users' data signals. Example embodiments include passing the decoded data signals via the backhaul. Example embodiments also include static and dynamic ordering of user data signals in conjunction with the application of SIC.

11 Claims, 9 Drawing Sheets

(56) References Cited

FOREIGN PATENT DOCUMENTS

| EP | 1 564 908 | 8/2005 |
| WO | WO 02/103920 A2 | 12/2002 |
| WO | WO 02/103920 A3 | 12/2002 |

OTHER PUBLICATIONS

Written Opinion of the International Search Authority (Separate Sheet) dated Nov. 5, 2010, issued in International Application No. PCT/US2009/005122.

International Preliminary Report dated Mar. 24, 2011.

* cited by examiner

DISTRIBUTED MULTI-CELL SUCCESSIVE INTERFERENCE CANCELLATION FOR UPLINK CELLULAR NETWORKS

BACKGROUND

Despite many advanced physical and link layer techniques (e.g. adaptive modulation and coding, HARQ, power control etc.) that are employed in today's wireless networks, a large number of mobile users, especially at the cell edges, receive intolerably low data rates due to high interference and path loss. Moreover, there is a growing demand for increasingly higher data rates in multimedia wireless networks. As a result, effective interference mitigation techniques are necessary to provide adequate quality of service in future wireless networks.

Fourth generation wireless systems (e.g. Long Term Evolution (LTE), WiMAX, and Ultra Mobile Broadband (UMB)) employ e.g., Orthogonal Frequency Division Multiple Access (OFDMA), which provides intra-cell interference avoidance by scheduling in-cell users on different time-frequency resources (e.g., tones). On the other hand, inter-cell interference from neighboring base transmissions continues to pose a significant problem.

SUMMARY

Further areas of applicability will become apparent from the description provided herein. It should be understood that the description and specific examples are intended for purposes of illustration only and are not intended to limit the scope of the present disclosure.

Example embodiments are directed to methods of reducing inter-cell interference in wireless networks using successive interference cancellation (SIC). Example embodiments provide a method including, receiving from a first network element, a decoded first data signal at a second network element through a backhaul. The method also includes canceling interference in a second data signal received at the second network element, based on the received decoded first data signal to produce a refined second data signal and decoding the refined second data signal at the second network element.

Example embodiments also provide a method of reducing inter-cell interference in a wireless network, including, receiving multiple versions of a first data signal, receiving at least one interfering data signal that interferes with at least one of the received multiple versions of the first data signal, and decoding the received interfering data signals. The method may also include, cancelling interference in the received multiple versions of the first data signal based on the corresponding decoded interfering data signals, to produce at least one refined version of the first data signal, decoding the received multiple versions of the first data signal including unrefined and refined versions, and selecting one of the decoded versions of the first data signal based on quality criteria. Example embodiments may also repeat the steps for a plurality of data signals in the wireless network. The wireless network may include a plurality of cells where the plurality of cells, each include a plurality of sectors.

Example embodiments also provide a method of reducing inter-cell interference in a wireless network, including, identifying a set of data signals and identifying a sub-set of the set of data signals having corresponding channel conditions below a threshold. The method may further include, ordering the sub-set of data signals from first to N, the first data signal having best channel (or link) conditions and the Nth data signal having worst channel (or link) conditions and identifying, for each data signal in the sub-set of data signals, cells within a plurality of cells that are likely to cause interference. The method may also include, decoding the ordered first data signal, cancelling interference for each of the remaining undecoded data signals, second to N, based on the decoded first data signal, and repeating the decoding and cancelling of the undecoded ordered data signals until the Nth data signal is decoded. Additional example embodiments may further include, determining new corresponding channel (or link) conditions after cancelling the interference for the remaining undecoded data signals, second to N, re-ordering the remaining undecoded data signals, the first having newly determined best corresponding channel (or link) conditions and the (N−1)th having newly determined worst corresponding channel conditions, and repeating the decoding, cancelling, determining, and re-ordering of the data signals until the Nth data signal is decoded.

BRIEF DESCRIPTION OF THE DRAWINGS

Example embodiments will be more clearly understood from the following detailed description taken in conjunction with the accompanying drawings. FIGS. 1-6 represent non-limiting, example embodiments as described herein.

DETAILED DESCRIPTION

Various example embodiments will now be described more fully with reference to the accompanying drawings in which some example embodiments are illustrated. In the drawings, the thicknesses of layers and regions may be exaggerated for clarity.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, e.g., "beneath," "below," "lower," "above," "upper" and the like, may be used herein for ease of description to describe one element or a relationship between a feature and another element or feature as illustrated in the Figures. It will be understood that the spatially relative terms are intended to encompass different orientations of the device in use or operation in addition to the orientation depicted in the Figures. For example, if the device in the Figures is turned over, elements described as "below" or "beneath" other elements or features would then be oriented "above" the other elements or features. Thus, for example, the term "below" can encompass both an orientation which is above as well as below. The device may be otherwise oriented (rotated 90 degrees or viewed or referenced at other orientations) and the spatially relative descriptors used herein should be interpreted accordingly.

It should also be noted that in some alternative implementations, the functions/acts noted may occur out of the order noted in the Figures. For example, two Figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the present invention and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements or control nodes (e.g., a scheduler located at a base station or Node B). Such existing hardware may include one or more digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

As used below the terms base station, base transceiver station (BTS), NodeB, network element, gateway, etc., are synonymous and may be used interchangeably to describe equipment that provides data connectivity between a wireless network and one or more UEs. Additionally where used below, the terms user, user equipment (UE), subscriber, mobile station, remote station, etc., are synonymous and may be used interchangeably to describe a remote user of wireless resources in a wireless communication network. Additionally where used below, the terms channel conditions and link conditions may be used interchangeably to describe the link quality which may be characterized in terms of Signal-to-Interference-Plus-Noise ratio or error rates.

Example embodiments address inter-cell interference mitigation issues by exploiting inter-base station cooperation. Example embodiments share interference-related information across base stations via the backhaul (e.g., wired such as twisted pair, optical fiber, etc. or wireless such as cellular, microwave, free space optical etc.) to coordinate multiple base station transmissions, e.g. for coordinated power control, for multi-cell cooperative beam-forming, or for multi-cell collaborative Multi-In Multi-Out (MIMO) antennas.

Example embodiments illustrate the benefits of multi-cell successive interference cancellation (SIC) for the uplink of a wireless network. Example embodiments may perform multi-cell interference cancellation selectively for a group of users (e.g., for cell-edge mobiles with high path-loss and interference), while signal enhancements may be achieved by cancelling only a few strongest interferers in order to maintain reasonable levels of backhaul overhead. Therefore, example embodiments achieve improved gains in terms of the cost-benefit trade-off at reasonable backhaul cost.

Example embodiments provide novel inter-cell cooperation methods in which cells (including e.g., sectors, base stations, network elements, etc.) may successfully decode their associated users' data, pass on the decoded symbols (e.g., bits, data, data signals, etc.) and associated control information to other cells (via the backhaul) suffering from poor signal reception conditions. Decoding users is intended to be broadly interpreted, for example, the data being decoded may include control information related to error control and recovery, scheduling information (i.e. radio resources allocated), modulation and coding scheme, power, pilot signal strength, etc. When the base stations serving users with unfavorable channels cancel the data of the strong interferers, the base stations may decode their own users at improved signal-to-noise-plus-interference ratios (SINRs).

By improving the decoding of users using the aforementioned interference cancellation techniques, average cell throughput (e.g., average throughput rate/user) and cell-edge throughput (e.g., worst throughput rate/user) may be improved since users benefiting from cancellation may achieve higher SINRs. Also, cell coverage may be improved since a larger fraction of users may be served successfully at a given information rate. Further, using inter-cell cooperation also allows service providers to deploy fewer base stations (with next generation technologies) in order to provide similar coverage to current systems thus saving on Capital Expenditures (CAPEX).

Figure 1:
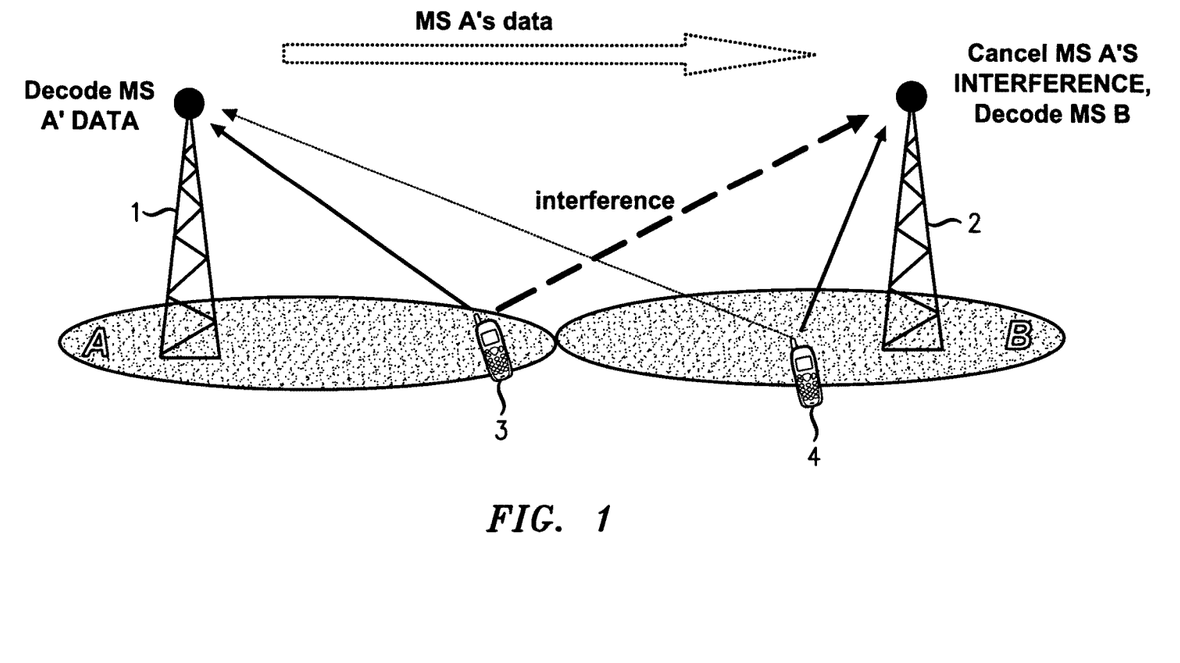
FIG. 1 illustrates a simple multi-cell interference cancellation method, according to example embodiments.

FIG. 1 illustrates a simple multi-cell interference cancellation method according to example embodiments, for a two cell network comprised of base stations A and B corresponding to elements 1 and 2, respectively, and their associated mobiles A and B, corresponding to elements 3 and 4, respectively. In FIG. 1, mobile station 3 interferes with mobile station 4 causing poor signal reception and hence unsuccessful decoding of mobile station 4's data signal at base station 2. In contrast, base station 1 may decode mobile station 3 successfully, even in the presence of interference from mobile station 4. Once base station 1 decodes mobile station 3's data signal, base station 1 may pass on the decoded data signal to base station 2 through the backhaul. Base station 2 (the base station performing cancellation) estimates the channel from mobile station 3 (an out-of-cell mobile) in order to cancel interference from mobile station 3, resulting in an improved signal-to-noise ratio for mobile station 4. This improvement is achieved at the cost of the additional backhaul overhead needed for base station 1 to exchange mobile station 3's decoded data with base station 2.

Figure 2:
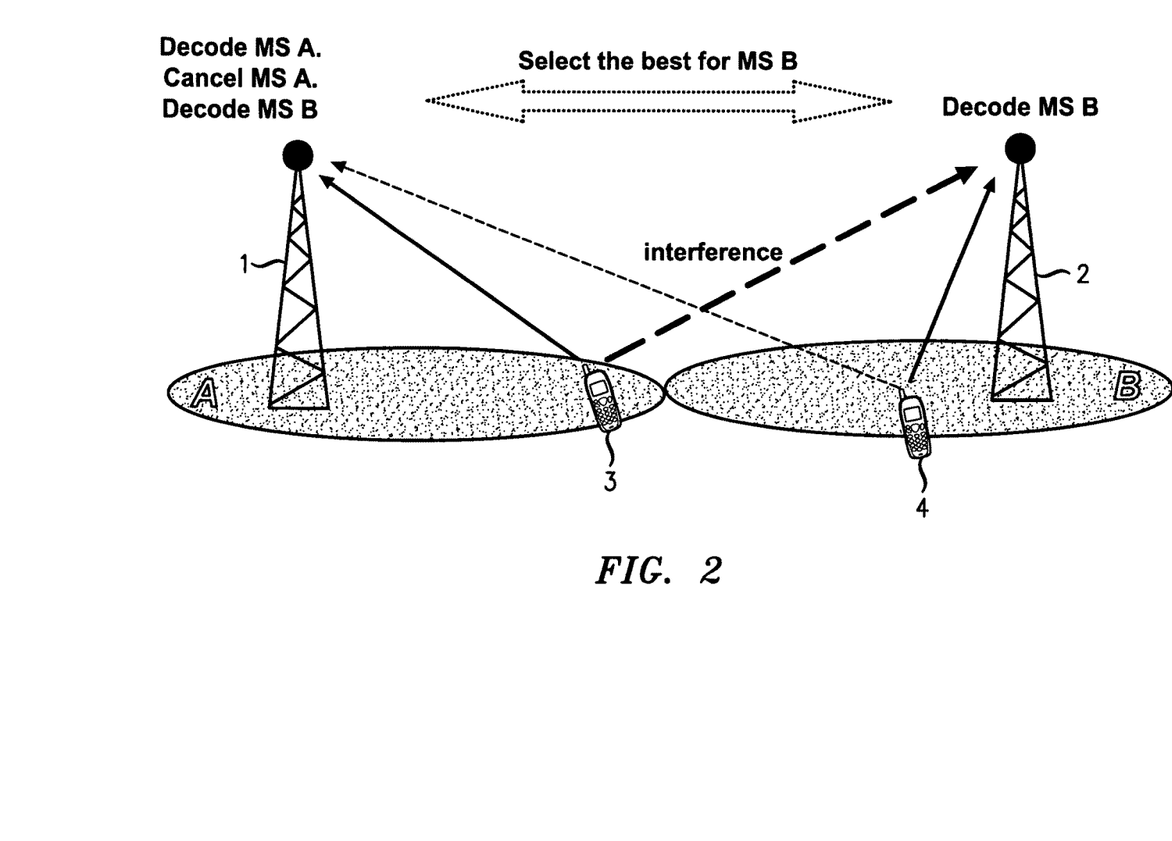
FIG. 2 illustrates interference cancellation at a secondary base station, according to example embodiments.

FIG. 2 illustrates another method according to example embodiments where interference cancellation may help in a multi-cell network. Here, both base station 1 and base station 2 attempt to decode mobile station 4's data signal. The difference from the method shown in FIG. 1 is that interference cancellation in FIG. 2 also takes place at base station 1. Once base station 1 decodes mobile station 3's data signal successfully, base station 1 cancels interference due to mobile station 3, resulting in a refined version of mobile station 4's data signal and then attempts to decode mobile station 4's refined data signal. Base station 2 also makes an attempt to decode mobile station 4's data signal in the presence of mobile station 3's interference. The better of the two outputs (the decoded mobile stations 4's data signal) is used as the decoded mobile station 4 data signal and hence mobile station 4 benefits from selection diversity. If base station 2 has the better output, then no data signal has to be moved in the backhaul, and hence the above method does not incur any backhaul overhead.

In determining the better output, the decoded data signals are compared using quality criteria. The quality criterion may include for example, error detection through a cyclic redundancy check sequence, comparison of effective Signal-to-Interference-Plus-Noise Ratio (SINR) estimates of the refined and unrefined received multiple versions of the first data signal prior to decoding, comparison of Bit Error Probability Estimates of the refined and unrefined received multiple versions of the first data signal prior to decoding, etc.

Figure 3:
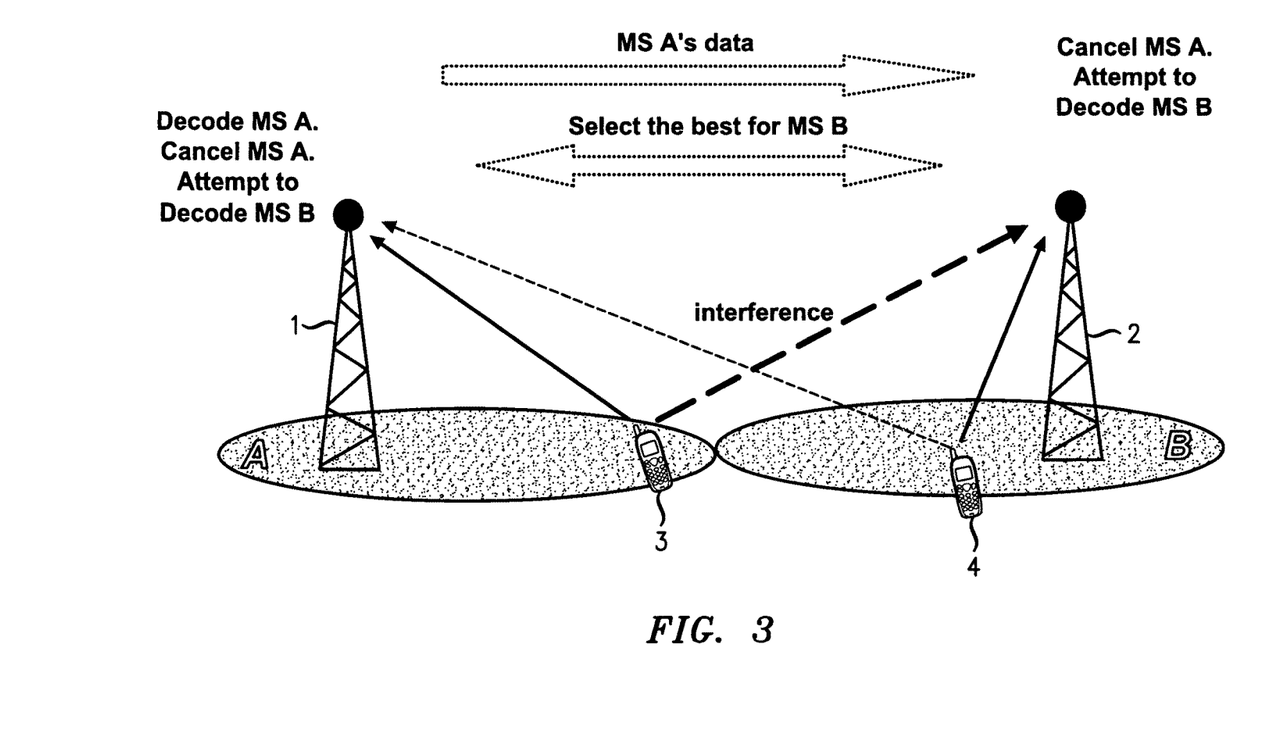
FIG. 3 illustrates a hybrid interference cancellation method, according to example embodiments.

FIG. 3 illustrates what is being referred to as a hybrid method including a combination of the methods illustrated in FIG. 1 and FIG. 2. In FIG. 3, both base station 1 and base station 2 attempt to decode mobile station 4's data signal after cancelling interference due to mobile station 3. In this example embodiment, mobile station 3's data signal may be carried in the backhaul to base station 2, and both base station 1 and base station 2 may perform interference cancellation. Mobile station 4 may therefore benefit from both selection diversity and interference cancellation at multiple cell sites.

As will be appreciated by those skilled in the art, base station 1 and base station 2 may each receive slightly different signals from mobile station 3 and mobile station 4, respectively, for example, due to path-loss, fading, etc. Therefore, the data signal from mobile station 4 received at base station 1 in the example embodiments may actually be a first version of multiple versions of the mobile station 4 data signal and the data signal received at base station 2 may be a second version of multiple versions of the mobile station 4 data signal. Therefore, for example in the method shown in FIG. 2, the outputs would be a decoded first version of the second data signal and a decoded second version of the second data signal.

Note that while the above example embodiments illustrate simple 2-cell, 2-user methods, additional example embodiments may apply to any arbitrary number of network elements, cells (and/or sectors) and/or users. Also, various methods may be repeated for a plurality of data signals in the wireless network.

Figure 4:
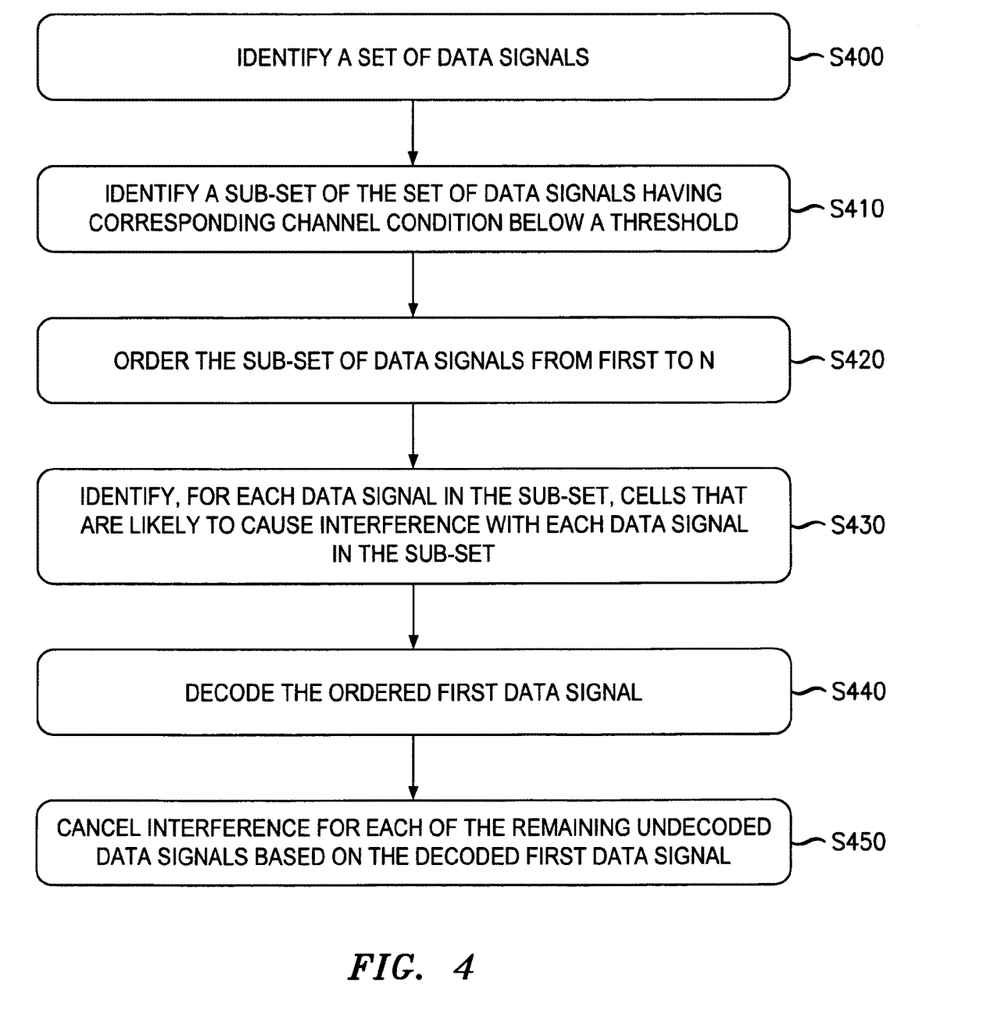
FIG. 4 is a flow chart illustrating the steps of applying multi-cell interference cancellation, according to example embodiments.

FIG. 4 is a flow chart showing various steps of the multi-cell SIC, according to example embodiments. In step S400 a set of data signals covering multiple cells/sectors, are identified that are to be considered for cancellation. In step S410 a sub-set of the set of data signals is identified that may benefit from multi-cell SIC. The identification of the sub-set of data signals may include identifying data signals that have channel (or link) conditions below a threshold. The threshold may be an SINR level that may be set by the service provider based on, e.g., user service agreement, minimum data rate, average data rate, etc. To identify the sub-set of data signals, each data signal is compared to the threshold and those below the threshold are included in the sub-set.

In step S420, the sub-set of data signals is ordered from first to N. The first ordered data signal may have the best channel conditions and the Nth data signal may have the worst channel conditions. In step S430, cells are identified that are likely to cause interference with each sub-set data signal within a plurality of cells/sectors. In step S440, the first data ordered data signal is decoded and in step S450, interference is canceled for each of the remaining undecoded data signals, second to N, based on the decoded first data signal. The decoding and canceling steps of the remaining undecoded ordered data signals may then be repeated until the Nth data signal is decoded.

Additional steps, which may be independent, may include estimating channel gains and phases corresponding to links between users that are likely to benefit from SIC and neighboring sectors that may exchange interfering user data for cancellation purposes, exchanging successfully decoded data for users decoded earlier (e.g., higher ranked users) in the order, and estimating corresponding channels for undecoded data signals. Also, the cancellation step may include canceling interference from the users, using the obtained channel estimates and any other conventional intra-sector receiver signal processing to decode lower ranked users.

Example embodiments may also include a "dynamic" ordering process as compared to the "static" ordering process described above. In dynamic ordering, new corresponding channel conditions may be determined after canceling the interference for the remaining second to N undecoded data signals as described above. Then a re-ordering of the remaining undecoded data signals is performed, where the first has the newly determined best channel conditions and the (N−1)th has the newly determined worst channel conditions. In order to keep this dynamic, the decoding, canceling, determining, and re-ordering steps are repeated until the Nth data signal is decoded.

Example embodiments may also be described using system models. First, an uplink of a wireless network with M base stations, each with r receive antennas, and N single antenna mobiles is described. The received signal model is given by:

$$y_i = h_{ii}x_i + \sum_{j \neq i} h_{ij}x_j + n_i \quad (1)$$

where $y_i \in C^r$ denotes the r-dimensional received signal at base station i, $h_{ij} \in C^r$ denotes the complex channel vector from user j to base station i, $x_j$ denotes the antenna output of user j, and $n_i \sim CN(0, \sigma^2 I_r)$ denotes the white Gaussian noise. When a linear receive beam-forming vector $w_i \in C^r$ is used for filtering $y_i$, the corresponding signal-to-noise-plus-interference ratio (SINR) $\gamma_i$ becomes:

$$\gamma_i = \frac{(w_i^+ h_{ii})^2 p_i}{\sum_{j=1, j \neq i}^{N}(w_i^+ h_{ij})^2 p_j + \sigma^2 (w_i^+ w_i)} \quad (2)$$

where $p_j$ denotes the transmit power of user j. We assume that a SINR-maximizing Minimum Mean Squared Error (MMSE) filter $$w_i = \left( \sum_{j=1, j \neq i}^{N} p_j h_{ij} h_{ij}^+ + \sigma^2 I_r \right)^{-1} h_{ii}$$

is employed. However, other types of receivers e.g., Maximal Ratio Combining, may also be used. Using the MMSE filter, the SINR is given by:

$$\gamma_i = p_i h_{ii}^+ \left( \sum_{j=1, j \neq i}^{N} p_j h_{ij} h_{ij}^+ + \sigma^2 I_r \right)^{-1} h_{ii}. \quad (3)$$

For the baseline SINR calculations, it is assumed that the mobiles transmit at full power and power control is not employed. Thus, $p_j = P$ for j=1, 2, . . . , N where P denotes the maximum power constraint.

A system model associated with the multi-cell SIC method shown in FIG. 1 is further described below. Basic rate and SINR calculations for the other example embodiments shown in FIG. 2 and FIG. 3 will follow easily to one of ordinary skill in the art, based on the model described below.

As FIG. 1 illustrates, the interference cancellation includes the decoded data signal and associated control information to be moved in the backhaul (from base station 1 to base station 2) which increases the backhaul load. In order to keep the overhead low, SIC may be employed only for a subset of mobiles. Therefore, the mobiles are grouped into two sets: the set of mobiles, S, that potentially benefit from SIC and the remaining set given by S'={1, 2, . . . , N}−S whose data signals are decoded in the conventional way (without SIC). With the objective to apply SIC for users with the worst channel conditions, a threshold SINR $\gamma_A$ may be used to define the set S; hence S={i:$\gamma_i \leq \gamma_A$, i∈{1, 2, . . . , N}}.

The mobiles in the set S' are decoded first in the presence of interference from all (N−1) users. Therefore, they achieve the SINR given by (3). For those in the set S we define a permutation $\pi(S)=[\pi(1), \pi(2), \ldots, \pi(|S|)]$ with $\pi(j) \in S$ for j=1, 2, . . . , |S| which determines the decoding order with SIC. Thus, the user $\pi(1)$ will decode first and can only cancel interference from users who have already decoded their data signals (those in the set S for $\pi(1)$). Consistent with the objective to help the users with the worst channels, a greedy ordering is selected such that:

$$\pi(S) = \{[\pi(1), \pi(2), \ldots, \pi(|S|)]: \gamma_{\pi(i)} < \gamma_{\pi(j)} \text{ for } i > j, \pi(i), \pi(j) \in S\} \quad (4)$$

Therefore, the user with the worst SINR in the network will decode last and may potentially cancel interference from everyone else. Given the above ordering (4), the SINR for a user i∈S may be written as:

$$\gamma_i^{SIC} = p_i h_{ii}^+ \left( \sum_{j \in S, j \neq i, \gamma_j < \gamma_i} p_j h_{ij} h_{ij}^+ + \sigma^2 I_r \right)^{-1} h_{ii}, i \in S. \quad (5)$$

As opposed to the decoding order given by (4) where the order is static and determined based on the baseline $\gamma_i$ (3), as described with reference to FIG. 4, an alternative dynamic user ordering scheme is also possible as discussed above. In the dynamic ordering, the user with the largest SINR in S decodes first (becomes $\pi(1)$), which is also the same user selected by (4). However, the second user in the order is the one with the largest SINR among the remaining |S|−1 users when the interference from the first user and the users in S' is assumed to be cancelled. Hence, denoting the set {$\pi(1)$, $\pi(2)$, . . . , $\pi(n-1)$} by $\pi_{n-1}$ the $n^{th}$ user $\pi(n)$ in the order is:

$$\pi(n) = \arg \max_{i \in S - \pi_{n-1}} p_i h_{ii}^+ \left( \sum_{j \neq i, j \in S - \pi_{n-1}} p_j h_{ij} h_{ij}^+ + \sigma^2 I_r \right)^{-1} h_{ii}. \quad (7)$$

Given the above ordering, equations (5) and (6) may be modified to obtain individual user SINRs and the corresponding backhaul overhead respectively.

The backhaul overhead with SIC may be determined as follows. As equation (5) implies, the user i∈S does not have interference from users in S' and those in the set S that satisfy the condition $\gamma_j > \gamma_i$. This includes the data signals of the cancelled users to be moved to the base station associated with user i. Accordingly, the backhaul overhead $B_i$ incurred due to user is interference cancellation operation is $$B_i = \sum_{j \in S'} \log_2(1 + \gamma_j) + \sum_{k \in S, \gamma_k > \gamma_i} \log_2(1 + \gamma_k^{SIC}) \quad (6)$$

where $\log_2(1+\gamma)$ is the Shannon rate at SINR $\gamma$, the first summation is the contribution from non-SIC users whose SINR is given in (3) and the second term is due to SIC-users with SINR given by (5). Summing over all users involved in the interference cancellation operation, the total backhaul overhead for multi-cell SIC becomes $$\sum_{i \in S} B_i.$$

In order to further reduce the backhaul overhead, the number of interferers to be cancelled may also be limited. For example, only the strongest few interferers may be cancelled for each SIC user. In the experimental examples (discussed below), results for n legs (n=3 or 6) interference cancellation where up to n users in the set $S' \cup S_{\gamma_j > \gamma_i}$ with the largest interference contribution to user i may be cancelled. Note that user j's contribution to user i's received signal is $p_j(w_i^+ h_{ij})^2$ according to (2).

EXPERIMENTAL EMBODIMENTS

Figure 5:
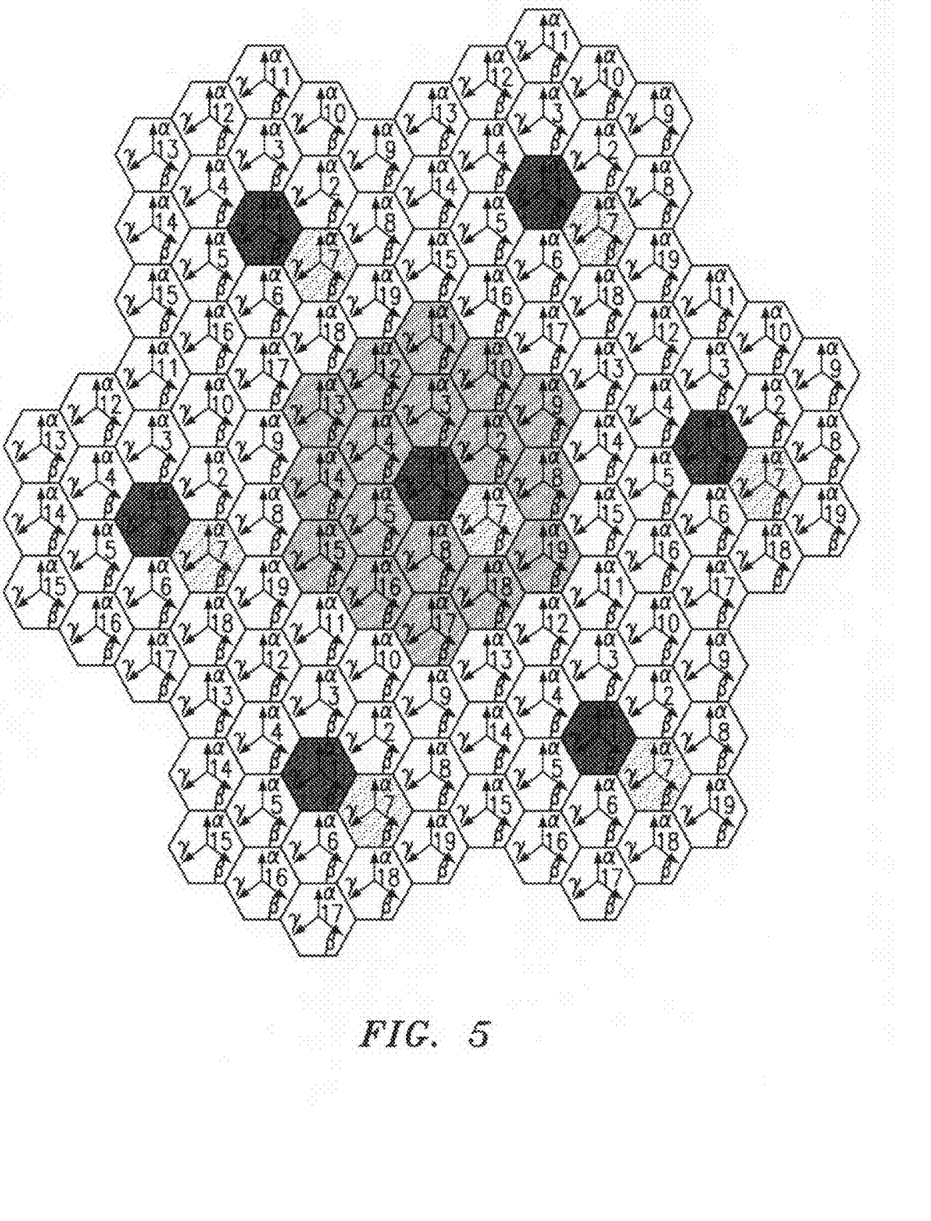
FIG. 5 illustrates a network topology of 19 cells/57 sectors with wrap-around, according to example embodiments.
Figure 6:
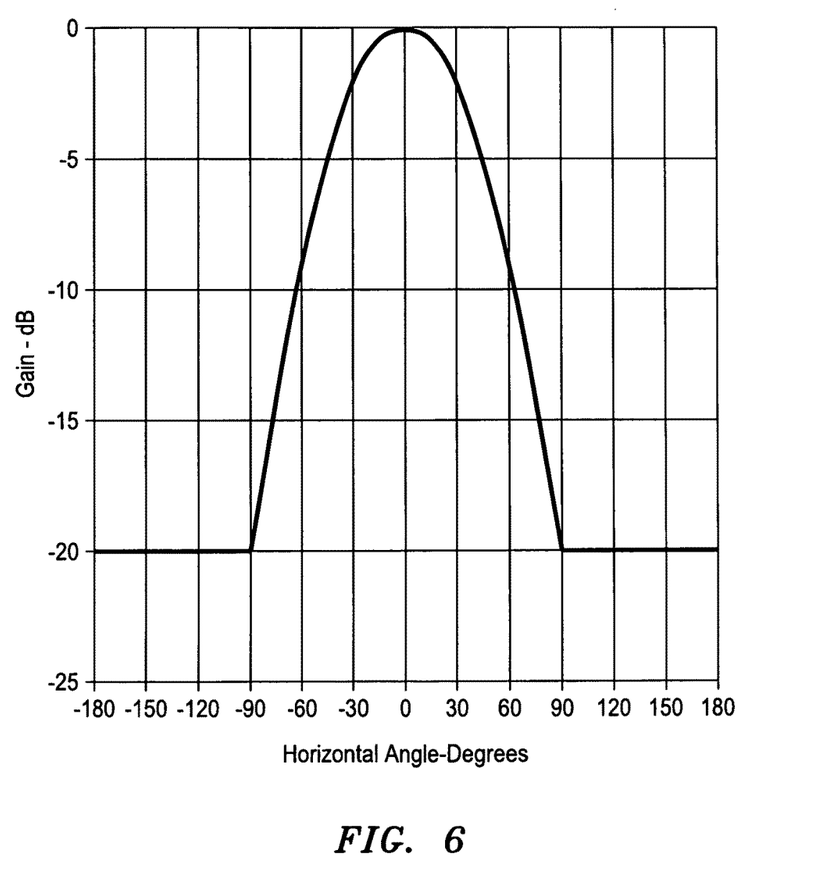
FIG. 6 illustrates a parabolic antenna configuration, according to example embodiments.

The experimental embodiments' simulation setup and parameters are primarily based on the IEEE 802.16m system evaluation methodology document. A standard 19 cells/57 sectors network topology, shown in FIG. 5, is considered with wrap-around and a site-to-site distance of 1 km. Each of the 57 sectors has 4 parabolic receive antennas (r=4), each with a 3 dB beam-width at 70 degrees, as shown in FIG. 6.

In addition to the distance dependent path-loss based on the urban macro-cellular Cost 231/Hata model, a shadow fading realization with 8 dB standard deviation (i.i.d. across base stations) and a Rayleigh fading realization with zero-mean unit variance complex Gaussian component (i.i.d. across antennas) are considered. Each sector is loaded with 1 user with a single omni-antenna. User-loading is performed sequentially in the following way: a user is placed uniformly across the 57 sector topology and the sector at which this user's received signal is strongest (based on the path-loss and the shadow fade) is determined. The user is associated with the sector found, if the sector is not already associated with another user; otherwise the user is discarded. This procedure is continued until each of the 57 sectors becomes associated with 1 user.

Transmit power for each mobile is 200 mw (23 dBm). Moreover, 17 and 0 dBi antenna gains are assumed for the base station and mobile antennas respectively. Each user is assumed to occupy a 250 KHz uplink channel (e.g., size of a typical uplink OFDMA tile). In addition to the background noise, 5 dB noise and 2 dB cable loss are assumed. The Cumulative Distributed Functions (CDFs) are obtained by a Monte-Carlo simulation based on 200 instances where each instance refers to a set of mobile locations and Rayleigh/Shadow realizations. The following cases are simulated and compared:

1. Maximal Ratio Combining (MRC) receiver at a single sector (using 4 in-sector receive antennas).
2. MMSE receiver at a single sector (using 4 in-sector receive antennas).
3. Limited Uplink Network MIMO joint MMSE-based receive beamforming) using 4 strongest sectors (16 antennas)
4. Limited Uplink Network MIMO using 7 strongest sectors (16 antennas)
5. Full Uplink Network MIMO (all 57 sectors, 57*4 antennas)
6. Full Uplink Network MIMO followed by SIC. In this case, users' received signals are processed and decoded one-by-one using all 57*4 network antennas, starting from the user with the largest SINR. Decoded users' signals are cancelled before the remaining users' MMSE processing/decoding.
7. Multi-cell SIC with 10%, 50%, and 100% of the mobiles benefiting from SIC (the worst 10%, 50% based on the baseline MMSE rates). 3 Legs (strongest 3 interferers) cancelled for each user.
8. Multi-cell SIC with 10%, 50%, and 100% of the mobiles benefiting from SIC (the worst 10%, 50% based on the baseline MMSE rates). 6 Legs (strongest 3 interferers) cancelled for each user.
9. Full Multi-cell SIC: All users benefiting from SIC. No limit on the number of legs/interferers to be cancelled, as long as the interferer has its data signal available, i.e. it has already decoded its data signal based on the SIC decoding order. The dynamic user ordering (Section II.D) given by (7) is applied.
10. The method shown in FIG. 2 where a user's data signal is also decoded at a secondary base in addition to its primary base and the user benefits from selection diversity.

Figure 7:
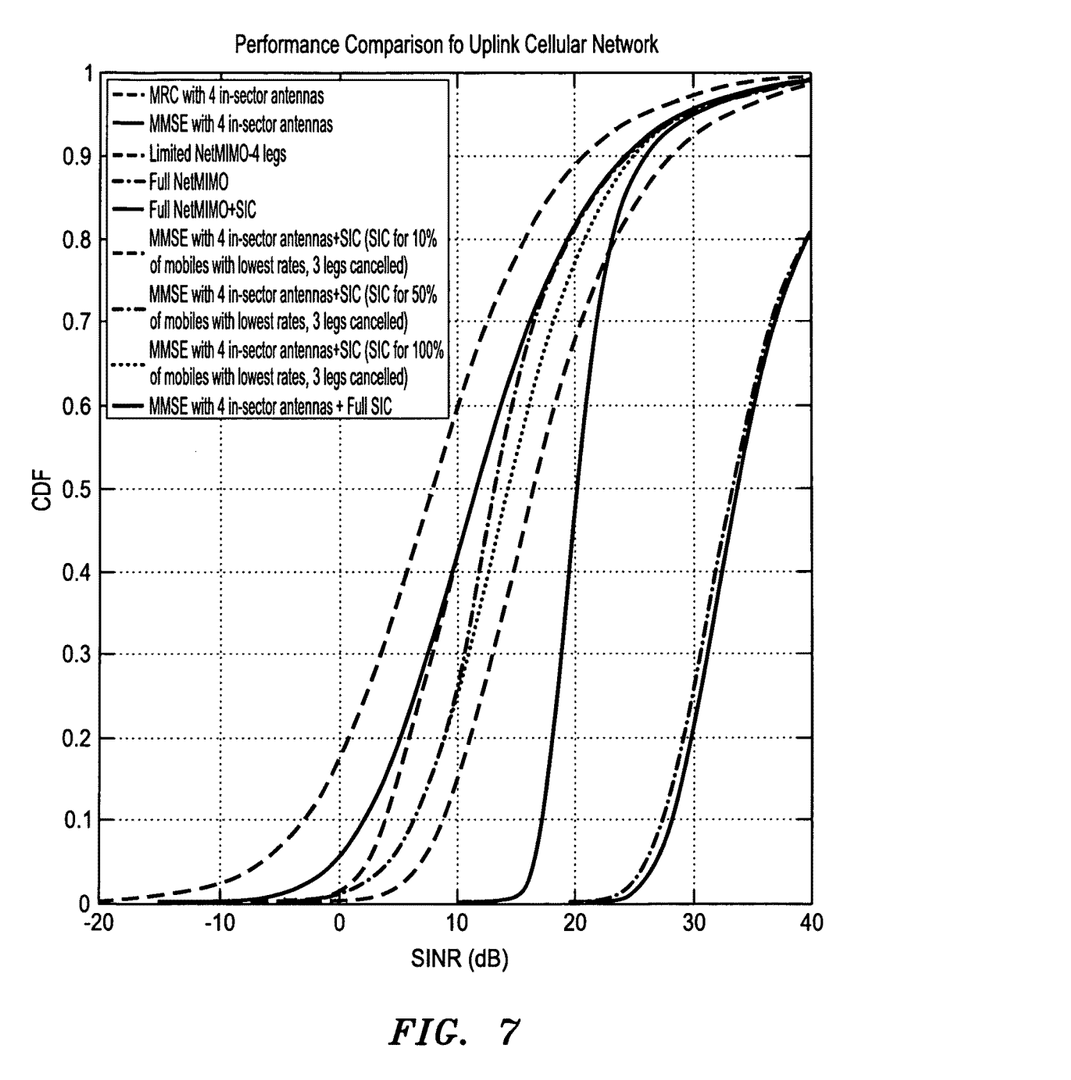
FIG. 7 is a graph of comparison uplink performance with SIC equal to 1 sector MMSE+3 legs SIC.
Figure 8:
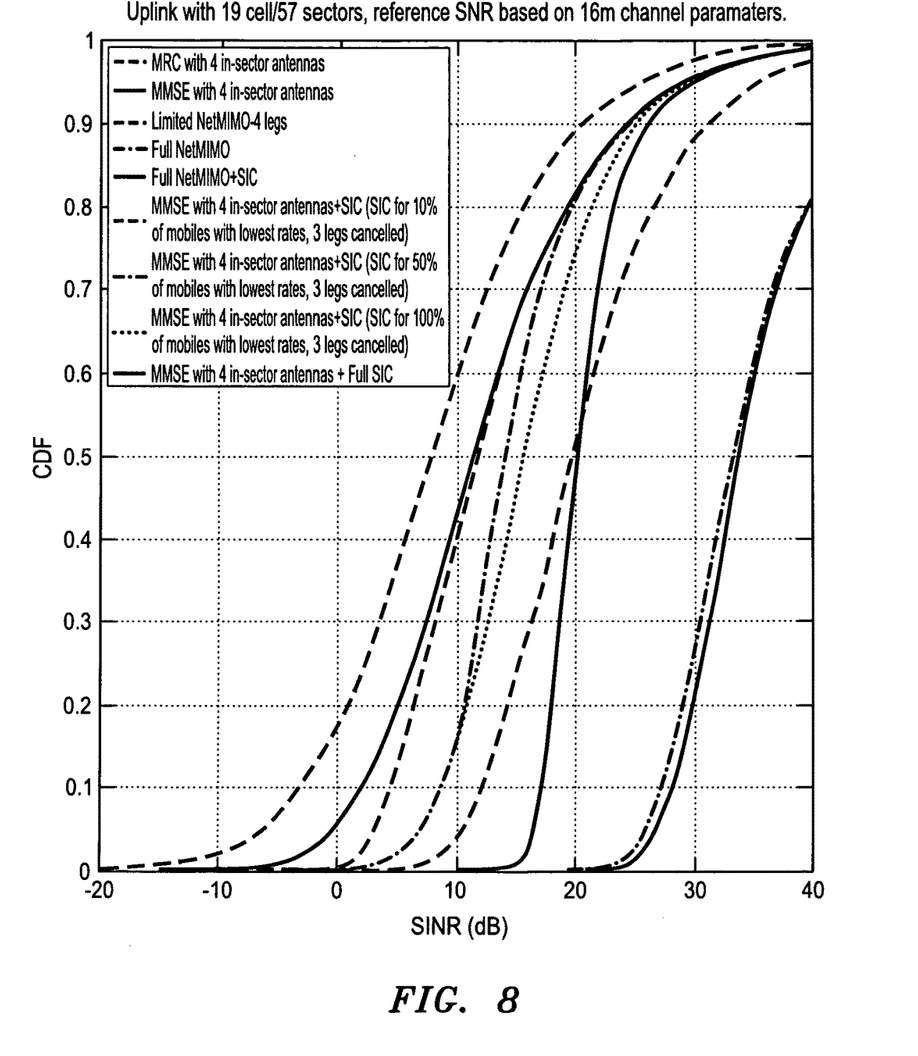
FIG. 8 is a graph of comparison uplink performance with SIC equal 1 sector MMSE+6 legs SIC.

The graphs of FIGS. 7 and 8 illustrate that when SIC is employed for half of the users with up to 3 legs cancellation for each user, 8-9 dB improvement is possible for cell-edge mobiles ($10^{th}$ percentile point in the CDF) compared to the baseline MRC receiver and 3-4 dB improvement is possible compared to the baseline MMSE receiver. When it is possible to cancel up to 6 legs for half of the mobiles, approximately 12 dB and 6-7 dB gains are possible with SIC compared to the baseline MRC and MMSE receivers, respectively. The improvement at the median CDF point is about 5 dB and 2 dB with 3 legs cancellation and about 6 dB and 3 dB with 6 legs cancellation with respect to MRC and MMSE, respectively.

Figure 9:
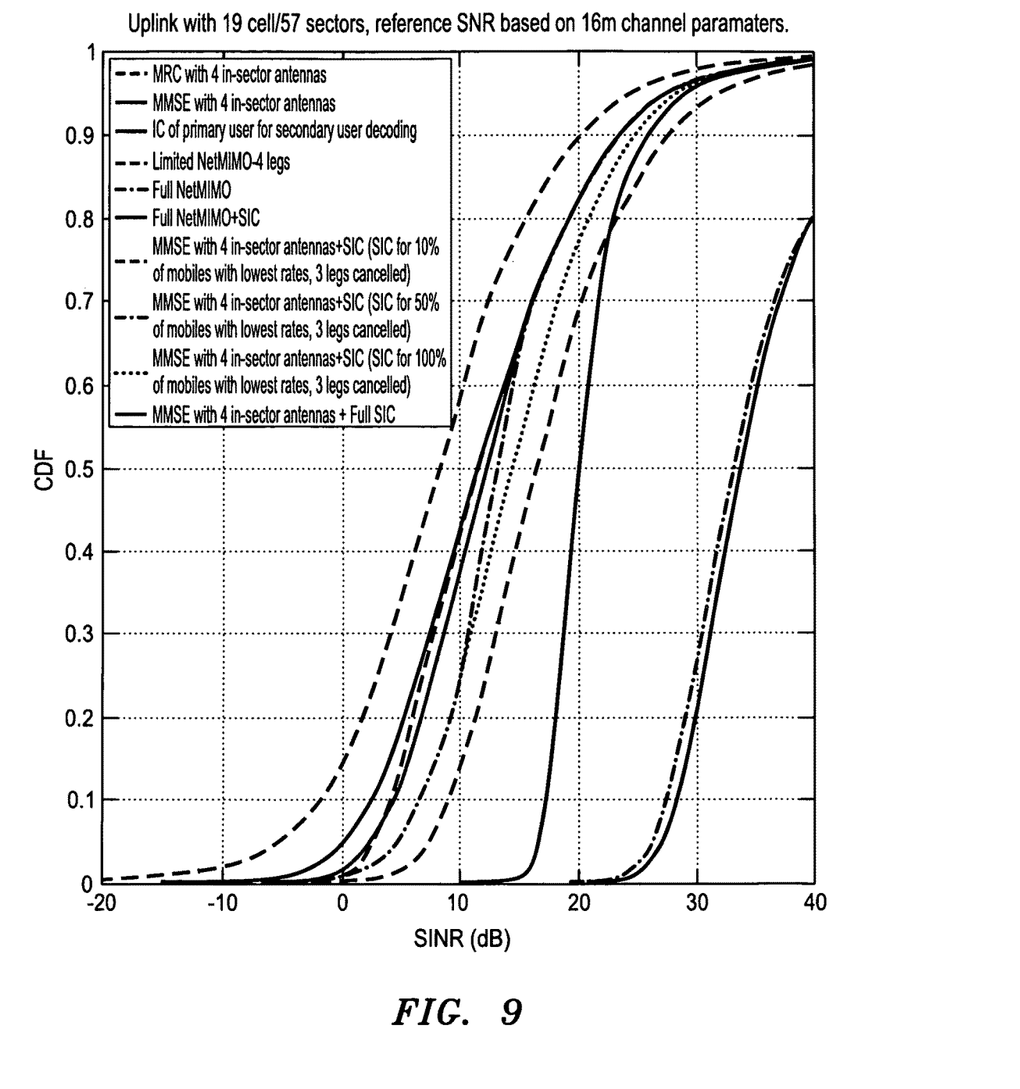
FIG. 9 is a graph of comparison uplink performance with SIC, including interference cancellation of the primary user for secondary user decoding.

On the other hand, with full multi-cell SIC, about 19-20 dB and 15-16 dB gains are possible at the cell-edge and about 12-13 dB and 7-8 dB gains are possible at the median CDF point with respect to MRC and MMSE. Finally, as shown in FIG. 9, the SIC method illustrated in FIG. 2 may not move the data signal in the backhaul and therefore does not incur any backhaul overhead, provides about 7 dB and 2 dB gains at the cell-edges with respect to MRC and MMSE receivers respectively.

As is described above, example embodiments provide effective inter-cell interference mitigation methods that may easily be employed in future wireless systems. When example embodiments are used, cell-edge throughput and average cell throughput may be increased. Moreover, since a larger fraction of users may be served successfully at a given information rate with multi-cell successive interference cancellation, cell coverage may also increase. Coverage improvement may help service providers save CAPEX by deploying fewer base stations.

Example embodiments of the present invention being thus described, it will be obvious that the same may be varied in many ways. Such variations are not to be regarded as a departure from the spirit and scope of the exemplary embodiments of the invention, and all such modifications as would be obvious to one skilled in the art are intended to be included within the scope of the invention.

What is claimed is:

1. A method of reducing inter-cell interference in a wireless network, comprising:

receiving, from a first network element, a decoded first data signal at a second network element through a backhaul;

cancelling interference in a second data signal received at the second network element, based on the received decoded first data signal to produce a refined second data signal if a channel condition of the second data signal is below a threshold, the threshold based on a signal-to-interference-plus noise ratio; and decoding the refined second data signal at the second network element.

2. The method of claim 1, wherein cancelling interference in the second data signal includes estimating a channel corresponding to the first data signal received at the second network element.

3. The method of claim 1, further including:

repeating the steps for a plurality of data signals in the wireless network, wherein the wireless network includes a plurality of cells.

4. The method of claim 3, wherein the plurality of cells include a plurality of sectors.

5. A method of reducing inter-cell interference in a wireless network, comprising:

identifying a set of data signals;

identifying a sub-set of the set of data signals having corresponding channel conditions below a threshold, the threshold based on a signal-to-interference-plus-noise ratio;

ordering the sub-set of data signals from first to N, the first data signal having best channel conditions and the Nth data signal having worst channel conditions;

identifying, for each data signal in the sub-set of data signals, cells within a plurality of cells that are likely to cause interference with each data signals in the sub-set of data signals;

decoding the ordered first data signal; cancelling interference for each of the remaining undecoded data signals, second to N, based on the decoded first data signal; and repeating the decoding and cancelling of the undecoded ordered data signals until the Nth data signal is decoded.

6. The method of claim 5, further comprising:

determining new corresponding channel conditions after cancelling the interference for the remaining undecoded data signals, second to N;

re-ordering the remaining undecoded data signals, the first having newly determined best corresponding channel conditions and (N−1)th having newly determined worst corresponding channel conditions;

repeating the decoding, cancelling, determining, and re-ordering of the data signals until the Nth data signal is decoded.

7. The method of claim 5, wherein the identifying a sub-set of the set of data signals having corresponding channel conditions below a threshold is based on the signal-to-noise-plus-interference ratio (SINR) of each data signal.

8. The method of claim 6, wherein the identifying a sub-set of the set of data signals having corresponding channel conditions below a threshold is based on the signal-to-noise-plus-interference ratio (SINR) of each data signal.

9. The method of claim 5, further including: receiving successfully decoded data signals; and estimating corresponding channels for undecoded data signals.

10. The method of claim 6, further including:

receiving successfully decoded data signals; and estimating corresponding channels for the undecoded data signals.

11. A wireless network system comprising:

at least a first network element sending a decoded first data signal to an at least second network element through a backhaul;

the at least second network element, cancelling interference in a second data signal received at the second network element, based on the received decoded first data signal to produce a refined second data signal, and decoding the refined second data signal if a channel condition of the second data signal is below a threshold, the threshold based on a signal-to-interference-plus noise ratio.

* * * * *